O. A. BINGHAM.

Tilting-Chair.

No. 6,478. Reissued June 8, 1875.

Witnesses.
M. A. Callan
C. D. Campbell

Inventor.
Osmore A. Bingham.
per Busby & Gregory
Att'ys.

THE GRAPHIC CO. PHOTO-LITH. 39 & 41 PARK PLACE, N.Y.

UNITED STATES PATENT OFFICE.

OSMORE A. BINGHAM, OF KEENE, NEW HAMPSHIRE, ASSIGNOR TO GEO. C. WINCHESTER, OF ASHBURNHAM, MASSACHUSETTS.

IMPROVEMENT IN TILTING CHAIRS.

Specification forming part of Letters Patent No. 147,891, dated February 24, 1874; reissue No. 6,478, dated June 8, 1875; application filed January 2, 1875.

*To all whom it may concern:*

Be it known that I, OSMORE A. BINGHAM, of Keene, in the county of Cheshire and State of New Hampshire, have invented certain Improvements in Tilting Chairs, of which the following is a specification:

This invention relates to a tipping chair, in which the seat is connected with its supporting-frame by means of a spring connection; and the invention consists in the combination with the seat and frame of the flat spring, coiled as described, and attached at one end to the pivot or axle about which the seat turns, and at the other end to the movable portion of the connection, as hereinafter set forth.

Figure 1:
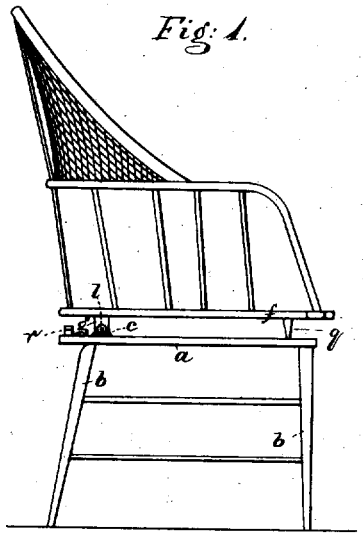
Figure 3:
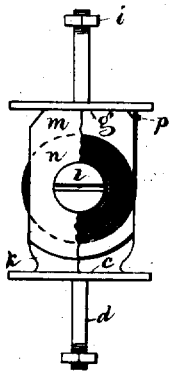
Figure 4:
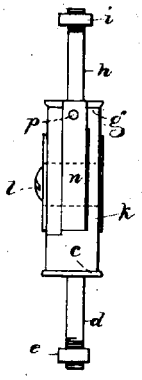
Figure 2:
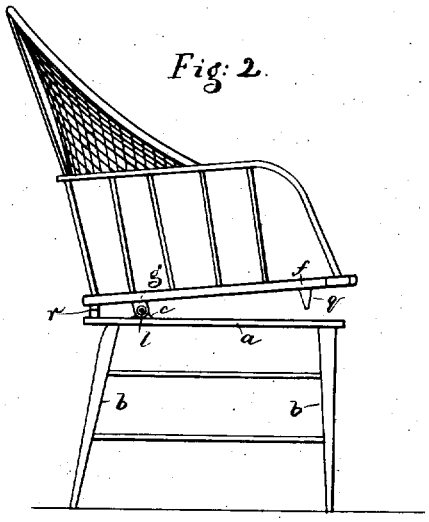

Figure 1 is a side view of a chair with my spring connection attached, and with the seat in its normal position. Fig. 2 is also a side view, but with the seat tipped back; and Figs. 3 and 4 show the spring connection detached.

*a* denotes the top of the support or stool-frame, and *b* its legs. The spring connection is composed of a plate, *c*, having an ear or bearing, *k*, that supports a horizontal pivot-pin, *l*, and of a plate, *g*, having an ear or plate, *m*, provided with an opening to receive, and bear, and turn on the pivot-pin *l*. The pin *l* is preferably split to receive the inner end of a strong clock or coiled spring, *n*, and the outer end of the spring is shown as attached to the plate *g* by means of a pin, *p*. The plate *c* is preferably provided, as shown, with a screw-shank, *d*, to attach the plate *c* of the connection to the frame of the seat-support *a*, and plate *g* has a similar screw-shank, *h*, for attaching the plate *g* of the connection to the seat. Ears or plates *k m* support between them the sides of the spring. Two of these spring connections, each constructed like the other, are used on each seat at opposite sides, and the stress of the springs *n n* tends to keep the front of the seat down in its normal or horizontal position; but this seat may be tipped back, when desired, against the stress of the spring, the springs in this action tightening.

The back motion of the seat may be arrested by a suitable stop, preferably a spring-stop or elastic cushion, marked *r*. A stop, preferably attached to the front part of the seat-frame *f*, governs the forward movement of the seat, or two similar stops on the front, if required.

I claim—

The flat spring, coiled as described, its outer end carried by and moving with the seat, and its inner end at the center of the coil connected with a pivot-pin, on which the seat turns, in combination with the seat-frame, its support and pivot-pin, and with a side plate, to prevent the spring from moving away from the center of the chair and off from the pivot-pin, substantially as and for the purpose described.

OSMORE A. BINGHAM.

Witnesses:

GEORGE C. CAMPBELL,
SILAS HARDY.